(12) United States Patent
Yazdanpanah et al.

(10) Patent No.: US 10,473,326 B2
(45) Date of Patent: Nov. 12, 2019

(54) METHOD AND PLANT FOR CHEMICAL LOOPING OXIDATION-REDUCTION COMBUSTION OF A GASEOUS HYDROCARBON FEEDSTOCK WITH IN-SITU CATALYTIC REFORMING OF THE FEED

(71) Applicants: IFP Energies nouvelles, Rueil-Malmaison (FR); Total Raffinage Chimie, Courbevoie (FR)

(72) Inventors: Mahdi Yazdanpanah, Le Havre (FR); William Pelletant, Saint-Genis-Laval (FR); Tiago Sozinho, Feyzin (FR); Stephane Bertholin, Chaponost (FR); Hélène Stainton, Lyons (FR); Ann Cloupet, Longes (FR); Florent Guillou, Ternay (FR)

(73) Assignees: IFP ENERGIES NOUVELLES, Rueil-Malmaison (FR); TOTAL RAFFINAGE CHIMIE, Courbevoie (FR)

( * ) Notice: Subject to any disclaimer, the term of this patent is extended or adjusted under 35 U.S.C. 154(b) by 145 days.

(21) Appl. No.: 15/535,010

(22) PCT Filed: Dec. 1, 2015

(86) PCT No.: PCT/EP2015/078244
§ 371 (c)(1),
(2) Date: Jun. 9, 2017

(87) PCT Pub. No.: WO2016/091666
PCT Pub. Date: Jun. 16, 2016

(65) Prior Publication Data
US 2017/0321887 A1    Nov. 9, 2017

(30) Foreign Application Priority Data
Dec. 12, 2014 (FR) ..................... 14 62320

(51) Int. Cl.
*F23C 10/01* (2006.01)
*F23C 10/02* (2006.01)
(Continued)

(52) U.S. Cl.
CPC ............. *F23C 10/01* (2013.01); *B01J 8/1827* (2013.01); *B01J 8/26* (2013.01); *C01B 3/44* (2013.01);
(Continued)

(58) Field of Classification Search
CPC .......... F23C 10/01; F23C 10/02; F23C 10/20; F23C 10/22; F23C 10/04; F23C 99/00;
(Continued)

(56) References Cited

U.S. PATENT DOCUMENTS 2,515,374 A * 7/1950 Jewell .................... B01J 8/1863
208/160
2,592,591 A * 4/1952 Odell ........................ C10J 3/12
422/649
(Continued)

FOREIGN PATENT DOCUMENTS

DE    102013211249 A1 * 12/2014 ............... C09K 5/16
EP    2551587 A2    1/2013
(Continued)

OTHER PUBLICATIONS

"WO 2013079817 A2—PCT FR2012000432—Machine Translation. pdf", machine translation, EPO.org, Jan. 3, 2019. (Year: 2019).*
(Continued)

*Primary Examiner* — Gregory L Huson
*Assistant Examiner* — Daniel E Namay
(74) *Attorney, Agent, or Firm* — Fitch, Even, Tabin & Flannery, LLP (57) ABSTRACT

In a method and a plant for chemical looping oxidation-reduction combustion (CLC) of a gaseous hydrocarbon feed,
(Continued)

for example natural gas essentially containing methane, catalytic reforming of the feed is performed within the reduction zone where combustion of the feed is conducted on contact with an oxidation-reduction active mass in form of particles. The reforming catalyst comes in form of untransported fluidized particles within the reduction zone. The catalyst thus confined in the reduction zone does not circulate in the CLC loop.

18 Claims, 2 Drawing Sheets

(51) Int. Cl.
| | |
|---|---|
| *F23C 10/20* | (2006.01) |
| *F23C 10/22* | (2006.01) |
| *B01J 8/26* | (2006.01) |
| *C01B 3/44* | (2006.01) |
| *F23C 10/04* | (2006.01) |
| *F23C 99/00* | (2006.01) |
| *B01J 8/18* | (2006.01) |

(52) U.S. Cl.
CPC ............. *F23C 10/02* (2013.01); *F23C 10/04* (2013.01); *F23C 10/20* (2013.01); *F23C 10/22* (2013.01); *F23C 99/00* (2013.01); *C01B 2203/0227* (2013.01); *C01B 2203/0233* (2013.01); *C01B 2203/06* (2013.01); *C01B 2203/1058* (2013.01); *C01B 2203/1082* (2013.01); *C01B 2203/1094* (2013.01); *C01B 2203/1241* (2013.01); *F23C 2900/99008* (2013.01); *Y02E 20/346* (2013.01)

(58) Field of Classification Search
CPC .. F23C 2900/99008; B01J 8/26; B01J 8/1827; C01B 3/44
USPC ...................... 431/7, 9; 252/373; 48/197 FM
See application file for complete search history.

(56) References Cited

U.S. PATENT DOCUMENTS

| | | | | |
|---|---|---|---|---|
| 2,723,223 A * | 11/1955 | Nicholson | ............... | C10B 55/10 |
| | | | | 201/12 |
| 5,447,024 A | 9/1995 | Ishida et al. | | |
| 5,827,496 A * | 10/1998 | Lyon | .................... | F01N 3/2006 |
| | | | | 423/659 |
| 6,022,390 A * | 2/2000 | Jakkula | .................. | B01D 45/12 |
| | | | | 208/161 |
| 8,974,757 B2 * | 3/2015 | Park | ........................ | C01B 3/105 |
| | | | | 423/220 |
| 9,089,826 B2 * | 7/2015 | Proell | .................... | B01J 8/0055 |
| 9,175,850 B1 * | 11/2015 | Touchton | ................ | F23C 10/10 |
| 2010/0104482 A1 * | 4/2010 | Morin | ...................... | B01J 29/90 |
| | | | | 422/142 |
| 2010/0279181 A1 * | 11/2010 | Adams, II | ............ | B01D 53/265 |
| | | | | 429/410 |
| 2011/0303875 A1 | 12/2011 | Hoteit et al. | | |
| 2012/0214106 A1 | 8/2012 | Sit et al. | | |
| 2013/0316292 A1 * | 11/2013 | Siriwardane | ............ | F23C 13/08 |
| | | | | 431/7 |
| 2014/0008205 A1 * | 1/2014 | Heydenrych | ........... | C10B 49/22 |
| | | | | 201/31 |
| 2014/0154634 A1 * | 6/2014 | Niass | .................. | C01B 13/0248 |
| | | | | 431/7 |
| 2014/0335461 A1 * | 11/2014 | Guillou | ................. | F23C 10/005 |
| | | | | 431/7 |
| 2015/0204539 A1 * | 7/2015 | Hoteit | ..................... | F23C 10/10 |
| | | | | 431/7 |
| 2015/0275111 A1 * | 10/2015 | Chandran | .............. | C10G 11/10 |
| | | | | 252/373 |
| 2015/0343416 A1 * | 12/2015 | Fadhel | ..................... | B01J 20/06 |
| | | | | 252/186.1 |
| 2016/0017799 A1 * | 1/2016 | Hoteit | ....................... | F02C 3/22 |
| | | | | 60/780 |
| 2016/0130503 A1 * | 5/2016 | Heydenrych | .......... | B01J 8/1809 |
| | | | | 201/2.5 |
| 2016/0146456 A1 * | 5/2016 | Guillou | ................. | F23C 10/005 |
| | | | | 431/7 |
| 2017/0001164 A1 * | 1/2017 | Zhang | .................... | B01J 8/1827 |
| 2017/0321886 A1 * | 11/2017 | Guillou | ..................... | C01B 3/40 |

FOREIGN PATENT DOCUMENTS

| | | | | |
|---|---|---|---|---|
| ES | 2324852 A1 * | 8/2009 | ............ | B01J 23/755 |
| FR | 2990695 A1 * | 11/2013 | ............... | C10G 3/00 |
| FR | 3001400 A1 | 8/2014 | | |
| WO | 2009/136909 A1 | 11/2009 | | |
| WO | WO-2010099555 A1 * | 9/2010 | ............... | C01B 3/46 |
| WO | WO-2013079817 A2 * | 6/2013 | ............ | F23C 10/005 |

OTHER PUBLICATIONS

International Search Report for PCT/EP2015/078244 dated Jan. 29, 2016; English translation submitted herewith (7 Pages).

* cited by examiner

METHOD AND PLANT FOR CHEMICAL LOOPING OXIDATION-REDUCTION COMBUSTION OF A GASEOUS HYDROCARBON FEEDSTOCK WITH IN-SITU CATALYTIC REFORMING OF THE FEED

CROSS-REFERENCE TO RELATED APPLICATIONS

This application is a U.S. national phase application filed under 35 U.S.C. § 371 of International Application No. PCT/EP2015/078244, filed Dec. 1, 2015, designating the United States, which claims priority from French Patent application Ser. No. 14/62,320 filed Dec. 12, 2014, which are hereby incorporated herein by reference in their entirety for all purposes.

FIELD OF THE INVENTION

The present invention relates to the field of chemical looping oxidation-reduction combustion (CLC) of hydrocarbons, in particular to the combustion of gaseous hydrocarbons such as methane.

BACKGROUND OF THE INVENTION

Chemical looping combustion or CLC: in the text hereafter, what is referred to as CLC (Chemical Looping Combustion) is an oxidation-reduction or redox looping method on an active mass. It can be noted that, in general, the terms oxidation and reduction are used in connection with the respectively oxidized or reduced state of the active mass. The oxidation reactor is the reactor where the redox mass is oxidized and the reduction reactor is the reactor where the redox mass is reduced.

In a context of increasing world energy demand, capture of carbon dioxide ($CO_2$) for sequestration thereof has become an indispensable means to limit greenhouse gas emissions harmful to the environment. Chemical looping combustion (CLC) allows to produce energy from hydrocarbon-containing fuels while facilitating capture of the $CO_2$ emitted upon combustion.

The CLC method consists in using redox reactions of an active mass, typically a metal oxide, for splitting the combustion reaction into two successive reactions. A first oxidation reaction of the active mass, with air or a gas acting as the oxidizer, allows the active mass to be oxidized. This reaction is usually highly exothermic and it generally develops more energy than the combustion of the feed. A second reduction reaction of the active mass thus oxidized, by means of a reducing gas from the hydrocarbon feed, then allows to obtain a reusable active mass and a gas mixture essentially comprising $CO_2$ and water, or even syngas containing hydrogen ($H_2$) and carbon monoxide (CO). This reaction is generally endothermic. This technique thus enables to isolate the $CO_2$ or the syngas in a gas mixture practically free of oxygen and nitrogen.

The balance of the chemical looping combustion, i.e. of the two previous reactions, is globally exothermic and it corresponds to the heating value of the treated feed. It is possible to produce energy from this process, in form of vapour or electricity, by arranging exchange surfaces in the active mass circulation loop or on the gaseous effluents downstream from the combustion or oxidation reactions.

U.S. Pat. No. 5,447,024 describes for example a chemical looping combustion method comprising a first reactor for reduction of an active mass by means of a reducing gas and a second oxidation reactor allowing to restore the active mass in its oxidized state through an oxidation reaction with wet air. The circulating fluidized bed technology is used to enable continuous change of the active mass from the oxidized state to the reduced state thereof.

The active mass going alternately from the oxidized form to the reduced form thereof, and conversely, follows a redox cycle.

Thus, in the reduction reactor, active mass $M_xO_y$ is first reduced to the state $M_xO_{y-2n-m/2}$ by means of a hydrocarbon $C_nH_m$ that is correlatively oxidized to $CO_2$ and $H_2O$, according to reaction (1), or optionally to a mixture $CO+H_2$, depending on the proportions used.

$$C_nH_m + M_xO_y \rightarrow nCO_2 + m/2 H_2O + M_xO_{y-2n-m/2} \qquad (1)$$

In the oxidation reactor, the active mass is restored to its oxidized state $M_xO_y$ on contact with air according to reaction (2), prior to returning to the first reactor.

$$M_xO_{y-2n-m/2} + (n+m/4)O_2 \rightarrow M_xO_y \qquad (2)$$

In the above equations, M represents a metal.

The efficiency of the circulating fluidized bed chemical looping combustion method is based to a large extent on the physico-chemical properties of the redox active mass.

The reactivity of the redox pair(s) involved and the associated oxygen transfer capacity are parameters that influence the dimensioning of the reactors and the rates of circulation of the particles. The life of the particles depends on the mechanical strength of the particles and on the chemical stability thereof.

In order to obtain particles usable for this method, the particles involved generally consist of a redox pair selected from among CuO/Cu, $Cu_2O$/Cu, NiO/Ni, $Fe_2O_3.Fe_3O_4$, FeO/Fe, $Fe_3O_4$/FeO, $MnO_2/Mn_2O_3$, $Mn_2O_3/Mn_3O_4$, $Mn_3O_4$/MnO, MnO/Mn, $Co_3O_4$/CoO, CoO/Co, or of a combination of some of these redox pairs, and sometimes a binder providing the required physico-chemical stability.

In general, and in particular in case of combustion of a gas feed of natural gas type, a high hydrocarbon conversion level, conventionally above 98%, is targeted while limiting the residence time of the reactants in the reaction zones in order to keep a realistic equipment size. These constraints require using a very reactive redox pair, which reduces the selection of the possible materials.

The NiO/Ni pair is often mentioned as the reference active mass for the CLC process for its oxygen transport capacities and its fast reduction kinetics, notably in the presence of methane. However, a major drawback is that nickel oxide has a high toxicity value, and it is classified as a CMR1 substance: Carcinogenic, Mutagenic or toxic for Reproduction of class 1, leading notably to significant constraints on the fumes filtration system. Furthermore, it has high cost. Indeed, since nickel oxide does not naturally occur with a sufficient concentration to allow interesting properties for the CLC process to be obtained, it is generally used concentrated in synthetic active mass particles whose manufacturing cost is high.

It can be noted that, in addition to the manufacturing cost, the cost of the active mass in a CLC process also involves the make-up active mass item, which can represent a significant part of the operating cost as a result of a continuous consumption of solid due to the inevitable attrition linked with the circulation of solid in the reactors where the gas velocities are relatively high. Thus, the cost related to the active mass is particularly high for synthetic particles, as opposed to particles obtained from some natural ores that can be less expensive.

Indeed, the use of natural ores as active mass for the CLC process, such as ilmenite or manganese ores, which can provide a satisfactory solution in terms of cost, is also known.

However, the use of such ores is generally less suited for combustion of gas feeds such as methane than for the combustion of solid or liquid feeds, in terms of process performance and of feed conversion ratio.

It is also known to use mixtures of natural metal oxides extracted from ores with nickel oxide.

Thus, a mixture of natural ilmenite ($FeTiO_3$) and nickel oxide was experimented by Ryden et al. for methane combustion in a CLC process ("Ilmenite with addition of NiO as oxygen carrier for chemical looping combustion", Rydén M. et al., Fuel 2010, 89, pp. 3523-3533). The behaviour of mixtures consisting of 95% ilmenite and 5% nickel oxide impregnated on various supports, among which an alumina support and a magnesium aluminate, was studied. These different solid mixtures were tested in the laboratory between 900° C. and 950° C. in two pilot plants, one operated in batch mode (single reactor) and the other in continuous combustion mode (active mass circulation loop between an air reactor and a fuel reactor). It appears that the presence of nickel oxide improves the feed conversion. However, significant transformations occur in the ilmenite structure, notably a decrease in density and an increase in the metal oxide porosity, likely to affect the lifetime of the particles. Particle agglomeration and sintering problems leading to CLC plant stoppage were also observed. These problems seriously call into question the advantage of using such a mixture as the oxygen carrier in a CLC process.

Using a mixture of natural hematite ($Fe_2O_3$) and nickel oxide was also tested within the context of a CLC process by Chen et al. ("Experimental investigation of hematite oxygen carrier decorated with NiO for chemical looping combustion of coal", Chen D. et al., Journal of Fuel Chemistry and Technology 2012, 40, 267-272). The mixture circulates between an air reactor and a fuel reactor, both operated in fluidized bed mode. Besides, on the one hand, this study is limited to the combustion of coal and, on the other hand, it appears that the reactivity of the mixture differs depending on the mixture preparation methods, with the appearance of pore blockage in some cases. According to this study, the mixture of natural hematite and nickel oxide is obtained either by mechanical blending or by means of an impregnation method. In the case of impregnation of a solution of nickel nitrates on natural hematite, the mixture exhibits a low specific surface area suggesting that the effect on the reaction performances cannot be significant. Furthermore, impregnation on the natural hematite particles, showing an 80% $Fe_2O_3$ hematite content, allows to form nickel oxide particles on the hematite particles, but it also leads to a reaction with the elements already present so as to form a stable phase, such as $NiAl_2O_4$ spinel. Another unwanted effect of impregnation is the dissolution of a fraction of the iron by the impregnation solution (the Fe/Si ratio is modified). These two effects, the appearance of a stable phase and the dissolution of the oxygen-carrying phase, result in a decrease in the mass concentration of active sites providing oxygen to the system. In case of mechanical blending of the natural hematite and the nickel oxide, stability and sintering problems under reducing conditions, particularly linked with the use of natural hematite, are expected. In any case, the mixture studied by Chen et al. poses problems of chemical interaction with the refractory materials linked with the diffusion of iron at the temperatures used in CLC processes.

Another example is described in patent application WO-2014/068,205 relating to a CLC process using an active mass comprising a natural manganese ore of pyrolusite type enriched with nickel oxide, in order notably to improve the CLC process performances in terms of hydrocarbon feed conversion ratio. However, a major drawback of such a method is that the nickel oxide is part of the active mass that circulates in the chemical loop and produces fines through attrition, like the aforementioned CLC processes presented in the studies by Ryden et al. and Chen et al. The presence of nickel particles in the fines is unwanted due to the toxicity of nickel oxide, which limits the amount of nickel oxide that can be used and induces significant constraints on the filtration of the effluents resulting from the combustion.

There is therefore a need for an efficient CLC process, notably in terms of feed conversion, suited to the treatment of a gaseous hydrocarbon feed and that can use an inexpensive material for the redox active mass, complying with environmental standards in terms of toxicity and reducing emissions.

SUMMARY OF THE INVENTION

In order to meet this need and to overcome at least partly the aforementioned drawbacks of the prior art, the applicants intend to carry out a step of catalytic reforming of the gas feed within the reduction zone where combustion of the feed is conducted on contact with the oxygen carrier. The reforming catalyst comes in form of untransported fluidized particles within the reduction zone, while the oxygen carrier comes in form of fluidized particles transported so as to circulate between the reduction zone and an oxidation zone where it is reoxidized. The reforming catalyst is thus confined in the reduction zone.

Combustion of the feed within the reduction zone allows to produce water vapour and $CO_2$, which go into the feed catalytic reforming reaction allowing to form syngas (CO+ $H_2$), which is in turn converted to steam and $CO_2$ on contact with the oxygen carrier.

The present invention aims to achieve a feed conversion ratio of the order of 98% or more. Indeed, using such an in-situ reforming zone allows to convert part of the gaseous hydrocarbon feed to syngas upon its combustion in the reduction zone, while using the reaction heat from the CLC loop. The reaction kinetics of the syngas with the oxygen carrier being higher than that of the gaseous hydrocarbon feed with the oxygen carrier, the CLC process performances are improved while limiting the residence time of the feed on contact with the oxygen carrier in order to limit the size of the reactors used.

Furthermore, the absence of circulation of the reforming catalyst outside the reduction zone, in particular in the oxygen carrier circulation loop between the reduction and oxidation zones, decreases the emission of fines through attrition. This type of emission can indeed be linked with the flow of particles through the various circulation elements between the two reactors, such as cyclones, risers, elbows, and it can also be linked with the thermal and chemical shocks related to redox reactions. Now, the emission of such fines can generate, when using CMR materials such as nickel, environmental and health risks. Furthermore, limiting this type of emission decreases the operating cost linked with the supply of make-up catalyst.

Besides, the syngas having good reactivity with most oxygen-carrying materials, in particular with inexpensive ores, it is then possible to minimize the costs related to the redox active mass while providing an efficient CLC process in terms of feed conversion ratio. Indeed, despite the fact that ores do generally not have a sufficient catalytic activity to induce in-situ reforming of the hydrocarbon feed, the present invention however allows to effectively ensure in-situ reforming of the feed by associating a reforming catalyst with the oxygen carrier within the reduction zone.

Thus, the present invention relates, according to a first aspect, to a method for chemical looping oxidation-reduction combustion of a gaseous hydrocarbon feed, comprising:
  performing combustion of a gaseous hydrocarbon feed within a fluidized-bed reduction zone through contact with a redox active mass in form of particles,
  performing catalytic reforming of said feed within said reduction zone on contact with a reforming catalyst distinct from the redox active mass, said catalyst coming in form of untransported fluidized particles within said reduction zone,
  performing combustion of the syngas produced by the catalytic reforming reaction within said reduction zone through contact with said redox active mass,
  sending to a fluidized-bed oxidation zone the redox active mass particles that have stayed in the reduction zone in order to oxidize said redox active mass particles through contact with an oxidizing gas stream.

Preferably, the size of the catalyst particles is so selected that said particles have a minimum fluidization velocity $U_{mf}$ lower than a given gas velocity $V_{sg}$ in the reduction zone and a terminal free fall velocity $U_T$ greater than said gas velocity $V_{sg}$.

The size of the catalyst particles preferably ranges between 1 mm and 30 mm, more preferably between 1.5 mm and 5 mm.

Gas velocity $V_{sg}$ in the reduction zone can range between 3 m/s and 15 m/s, preferably between 5 m/s and 10 m/s.

Preferably, the reforming catalyst comprises nickel.

Advantageously, the reforming catalyst comprises between 6 and 25 wt. % nickel, preferably on an alumina support.

The nickel can initially come in form of nickel oxide, and the mass fraction of nickel oxide of the catalyst in relation to the mass fraction of the redox active mass ranges between 0.1% and 15%, preferably between 1% and 5%.

The redox active mass advantageously consists of metal oxides from ores.

Preferably, the grain size of the redox active mass particles is such that over 90% of the particles have a size ranging between 50 μm and 500 μm, preferably between 100 μm and 300 μm.

Preferably, the gaseous hydrocarbon feed essentially comprises methane. It can be natural gas, biogas or refinery gas.

According to a second aspect, the present invention relates to a plant for combustion of a gaseous hydrocarbon feed according to the described method, comprising:
  a reduction zone including:
    means of injecting said gaseous hydrocarbon feed,
    an inlet for a stream of a redox active mass in form of particles,
    an outlet for a mixture comprising a gas stream and the active mass particles,
    a reforming catalyst in form of untransported fluidized particles,
  an oxidation zone provided with a feed point for redox active mass particles that have stayed in the reduction zone, means of injecting an oxidizing fluidization gas, and an outlet for an oxygen-depleted oxidizing gas and oxidized redox active mass particles.

Preferably, the reduction zone is a reactor comprising:
  a basal part for catalyst particles re-acceleration, in form of an inverted truncated cone,
  a substantially cylindrical intermediate part topping said basal part,
  a cylindroconical top part for disengagement of the catalyst particles, topping said intermediate part.

BRIEF DESCRIPTION OF THE FIGURES

Other features and advantages of the invention will be clear from reading the description hereafter of embodiments given by way of non limitative example, with reference to the accompanying figures wherein.

In the figures, the same reference numbers designate identical or similar elements.

DETAILED DESCRIPTION OF THE INVENTION

It can be noted that, in the present description, what is referred to as "in-situ reforming" of the gaseous hydrocarbon feed is reforming conducted within the reduction zone. It is reminded that a reduction zone must be understood here, in connection with the definition of the CLC process given above, as a reaction zone where the redox mass is reduced through contacting with the gaseous hydrocarbon feed, leading to the combustion of said feed. The reforming reaction is detailed below in connection with the description of FIG. 1.

In the present description, the expressions "oxygen-carrying material", "oxygen carrier", "redox mass" and "redox active mass" are equivalent. The redox mass is referred to as active in connection with the reactive capacities thereof, in the sense that it is capable of acting as an oxygen carrier in the CLC process by capturing and releasing oxygen. The abbreviated expression "active mass" or the term "solid" can also be used.

In the CLC method according to the invention, the hydrocarbon feeds used are gaseous hydrocarbon feeds, preferably consisting essentially of methane, for example natural gas, biogas or refinery gas.

The present invention aims to use a reforming catalyst within the reduction zone where combustion of the feed is performed on contact with the oxygen carrier, in order to accelerate conversion of the feed. The catalyst comes in form of fluidized particles, like the oxygen carrier. However, the catalyst particles are untransported and they are thus confined within the reduction zone, unlike the oxygen carrier particles that are discharged from the reduction zone simultaneously with the combustion products in order to be sent to the oxidation reactor.

Figure 1:
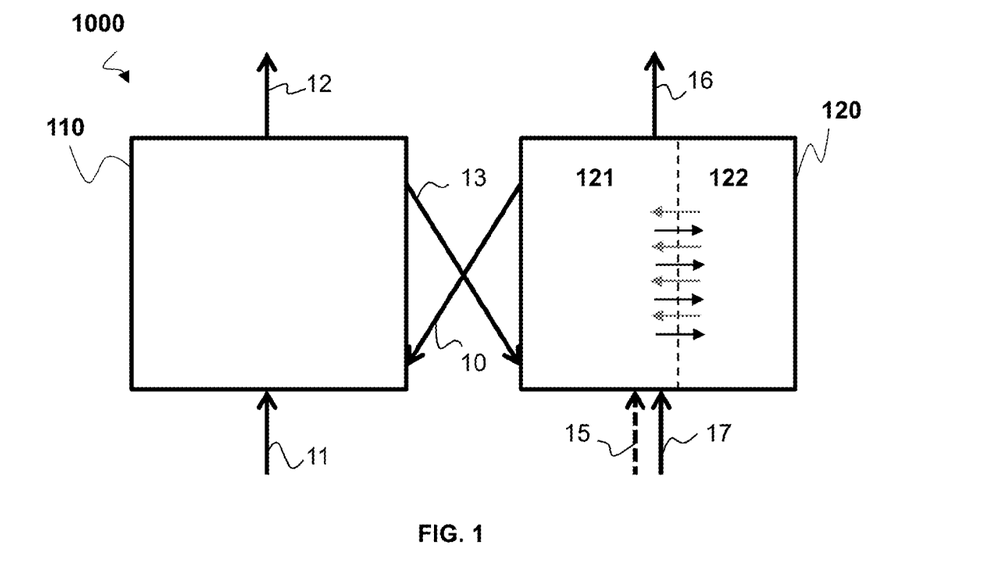
FIG. 1 schematically illustrates the implementation of the CLC process according to the invention, wherein catalytic reforming of the gas feed on contact with a catalyst confined in the reduction zone is performed simultaneously with combustion of the feed on contact with a circulating oxygen carrier.

FIG. 1 is a simplified block diagram showing the implementation of the CLC process according to the invention.

Chemical looping combustion plant 1000 comprises an oxidation zone 110, also referred to as oxidation reactor or "air reactor", whose function is to oxidize an oxygen carrier 10 in form of particles coming from a reduction zone 120, also referred to as reduction reactor or "fuel reactor", whose function is to achieve reduction of the oxygen carrier on contact with a gas feed so as to release the oxygen of the carrier and to perform combustion of the feed. Both reactors are operated in fluidized bed mode, and the oxygen carrier circulates between the two zones so as to form the chemical looping combustion loop. The arrows between the two reaction zones 110 and 120 schematically show the transport lines in which oxygen carrier (10, 13) circulates. It is understood that these transport lines can comprise various devices such as, by way of non exhaustive example, solid flow control devices like valves, gas/solid separation devices, elutriation devices, heat exchange devices, or sealing elements such as siphons.

Oxygen carrier 10 from reduction zone 120 is in an entirely or partially reduced state and it reacts, within oxidation zone 110, on contact with an oxidizing gas stream 11, such as air, according to reaction (2) described above. This results in an oxidizing gas stream depleted in oxygen 12, depleted air for example, and an oxygen-carrying solid stream oxidized again 13. Oxidation zone 110 is operated in fluidized bed mode, with a co-current ascending flow of oxygen carrier particles 10 and oxidizing gas 11. Oxygen-depleted oxidizing gas stream 12 and solid stream 13 are generally discharged at the top of the oxidation zone through the same outlet, then sent to at least one gas/solid separation device (not shown) allowing to separate gas stream 12 from solid stream 13 that is sent back to reduction zone 120. The oxidation zone is thus provided with a feed point for an oxygen carrier from reduction zone 120, injection means for oxidizing gas 11 allowing fluidization of the oxygen carrier particles, such as an injection ring, also referred to as dispensing ring, or any other suitable means (perforated plate, bubble-cap tray, injection nozzle, diffuser, etc.), and an outlet for an oxygen-depleted oxidizing gas 12 and oxidized oxygen carrier 13. Reduction zone 110 is preferably a substantially elongate and vertical reactor commonly referred to as riser. The temperature of the fluidized bed in the oxidation zone generally ranges between 700° C. and 1100° C.

Oxygen-carrying solid 13 is sent to reduction zone 120. The purpose of this zone is to achieve combustion of a fuel consisting of a gaseous hydrocarbon feed 17 by contacting this feed with oxygen carrier 13 that releases, by reduction of the carrier, the oxygen acting as an oxidizer. The global reaction is reaction (1) summarized above. More in detail, in the case of gaseous hydrocarbon feed conversion in a CLC process, as in the present invention, two steps can be distinguished upon combustion of the feed on contact with the oxygen carrier. These steps can be carried out with or without desorption of the syngas. First, the hydrocarbon molecule is converted to a syngas on the oxygen carrier according to Equation (3), then the syngas formed is oxidized on the oxygen carrier to CO and $H_2$ according to Equations (4) and (5). The syngas conversion reactions according to Equations (4) and (5) exhibit very high kinetics in comparison with the formation reaction of this syngas according to Equation (3).

$$C_nH_m + nM_xO_y \rightarrow nCO + \frac{m}{2}H_2 + nM_xO_{y-1} \quad (3)$$

$$CO + M_xO_y \rightarrow CO_2 + M_xO_{y-1} \quad (4)$$

$$H_2 + M_xO_y \rightarrow H_2O + M_xO_{y-1} \quad (5)$$

Reduction zone 120 is operated in fluidized bed mode, with co-current ascending flow of the oxygen carrier particles and of feed 17. Fluidization is provided by gas feed 17.

The redox mass can consist of metal oxides such as, for example, Fe, Ti, Ni, Cu, Mn, Co, V oxides, alone or in admixture, which can be extracted from ores, such as ilmenite ($FeTiO_3$) or a natural manganese ore such as pyrolusite ($MnO_2$), or it can be synthetic (for example iron oxide particles supported on alumina $Fe_2O_3/Al_2O_3$), with or without a binder, and it has the required redox properties and the characteristics necessary for performing fluidization.

Advantageously, the redox mass is obtained from ores, generally less expensive than synthetic particles. According to the invention, catalytic reforming within the reduction zone, as described below, actually allows this type of active mass to be used since the syngas resulting from reforming exhibits good reactivity with most oxygen-carrying materials. The ore can be previously crushed and screened in order to obtain an active mass of grain size compatible with fluidized-bed operation.

The oxygen storage capacity of the redox mass advantageously ranges, depending on the material type, between 1 and 15 wt. %. Advantageously, the amount of oxygen effectively transferred by the metal oxide ranges between 1 and 3 wt. %, which allows only a fraction of the oxygen transfer capacity, ideally less than 30% thereof, to be used so as to limit risks of mechanical aging or particle agglomeration. Using a fraction only of the oxygen transport capacity also affords the advantage that the fluidized bed acts as a thermal ballast and thus smoothes the temperature variations imposed by the reactions.

The active mass comes in form of fluidizable particles belonging to groups A or B of Geldart's classification. By way of non-limitative example, the redox active mass particles can belong to group B of Geldart's classification, with a grain size such that over 90% of the particles have a size ranging between 50 µm and 500 µm (Sauter mean diameter), preferably between 100 µm and 300 µm, for a density ranging between 1000 kg/m³ and 6000 kg/m³, preferably between 1500 kg/m³ and 5000 kg/m³.

The redox active mass can be subjected to an activation step so as to increase the reactive capacities thereof; it can consist of a temperature rise phase, preferably progressive, and preferably in an oxidizing atmosphere, in air for example.

According to the invention, the reduction zone comprises a reforming catalyst in form of untransported fluidized particles allowing catalytic reforming of the feed.

Reduction zone 120 thus comprises means for injecting gaseous hydrocarbon feed 17, such as an injection ring, also referred to as dispensing ring, or any other suitable means (perforated plate, bubble-cap tray, injection nozzle, diffuser, etc.), an inlet for the redox active mass stream in form of particles, an outlet for the mixture comprising gas stream 16 and reduced active mass particles 10, a reforming catalyst in form of untransported fluidized particles, and optionally steam and/or $CO_2$ injection means 15.

Reforming of the hydrocarbon feed can be performed with steam. The catalytic steam reforming reaction is summarized by Equation (6) below. The steam is produced by the combustion of the feed on contact with the oxygen carrier. Catalytic reforming of the feed can also be achieved with $CO_2$ according to Equation (7) below, which is referred to as "dry" reforming. Steam is a more efficient reforming agent than $CO_2$ under the operating conditions of the CLC process.

$$C_nH_m + nH_2O \xleftrightarrow{Catalyst} nCO + \left(n + \frac{m}{2}\right)H_2 \qquad (6)$$

$$C_nH_m + nCO \xleftrightarrow{Catalyst} 2nCO + \frac{m}{2}H_2. \qquad (7)$$

The amount of steam and $CO_2$ produced upon combustion of the feed on contact with the oxygen carrier is sufficient to enable reforming of the feed in the reduction zone. Optionally, steam and/or $CO_2$ 15, preferably steam, can be injected into the reduction reactor to complete the steam and/or the $CO_2$ produced by the combustion of the feed and involved in the feed reforming reactions.

The steam and the $CO_2$ present in the reduction zone also allow to prevent coke deposition on the surface of the catalyst particles. Coke formation occurs according to the main two pathways below. A first pathway corresponds to the cracking of hydrocarbons such as methane $CH_4$ according to reaction (8) as follows:

$$CH_4 \rightarrow C + 2H_2 \qquad (8)$$

A second pathway corresponds to the Boudouard reaction according to Equation (9) hereafter:

$$2CO \rightarrow C + CO_2 \qquad (9).$$

The presence of water and of $CO_2$ allows to limit coke formation by gasifying the carbon deposits. It is well known that a $H_2O/CO$ ratio above 1 (steam to carbon ratio S/C), as shown by Ishida et al. (Ishida M., Jin H., Okamoto T. "*Kinetic Behavior of Solid Particle in Chemical Looping Combustion: Suppressing Carbon Deposition in Reduction*" Energy & Fuels 1998; 12:223-9), leads to a negligible coke formation.

Reduction zone 120 comprises two sub-zones 121 and 122 that are not separated from one another. In the diagram, the position of the two sub-zones is not representative of reality, these two zones are only shown by way of illustration of the two reaction types, i.e. combustion and reforming, that occur in the reduction zone. Zone 121 represents the combustion zone where the combustion reactions on contact with oxygen carrier 13 in form of transported fluidized particles occur. Zone 122 corresponds to the zone comprising the reforming catalyst in form of untransported fluidized particles. This zone 122 can be arranged over the total height of the fluidized bed of reduction zone 120 or over part of the bed between fixed heights. Gaseous hydrocarbon feed 17 injected into reactor 120, such as natural gas, comes into contact with oxygen carrier 13. The combustion of part of the feed produces $CO_2$ and $H_2O$. This $CO_2$ and $H_2O$ stream, as well as part of the injected feed, then come into contact with the reforming catalyst, as shown by the black arrows between zones 121 and 122. Partial reforming of the feed occurs in the presence of the catalyst, producing syngas (CO and $H_2$), according to reaction Equations (6) and (7) above. The syngas produced, coming into contact with the oxygen carrier particles, as shown by the grey arrows from zone 122 to zone 121, is then converted to $CO_2$ and $H_2O$ (reaction Equations (4) and (5) above).

The reactions in this reduction zone 120 result in a stream of fumes 16 comprising nearly exclusively $CO_2$ and $H_2O$, and a stream of reduced oxygen-carrying solid 10 intended to be sent to oxidation zone 110 so as to be oxidized again, thus looping the chemical combustion loop. Fumes 16 and solid stream 10 are generally discharged at the top of the reduction zone through the same outlet, then sent to a gas/solid separation device (not shown) allowing fumes 16 to be separated from the solid stream that is sent back to oxidation zone 110. The reforming catalyst is confined within the reduction zone. This confinement is provided by the suspended state of the catalyst particles: the particles are not transported within the fluidized bed of the reduction zone, as detailed hereafter.

The reforming catalyst is distinct from the redox active mass. The catalyst differs from the redox active mass at least due to its function and its suspended state in the fluidized bed.

The function of the reforming catalyst is to catalyze the feed reforming reaction for the production of syngas according to Equations (6) and (7), and not to supply the oxygen required for combustion of the feed (Equations (1), (3) to (5)), as is the case for the redox active mass.

Any type of catalyst suited for reforming the gaseous hydrocarbon feed, generally well known to the person skilled in the art, can be used. By way of non limitative example, a catalyst with a nickel-based active phase is used, in particular for reforming a feed predominantly comprising methane on contact with steam, according to the well known steam methane reforming (SMR) reaction. The steam methane reforming reaction is summarized by Equation (10) below:

$$CH_4 + H_2O \leftrightarrow CO + 3H_2 \qquad (10)$$

The catalyst comes in form of monometallic catalytic particles supported on various metal oxides such as, by way of non limitative example, alumina, calcium oxide CaO, magnesium oxide MgO, mixed oxides such as $Al_2O_3$—CaO. Preferably, the catalyst comprises nickel. Advantageously, the particles have a nickel base as the active phase, notably in the case of combustion of a hydrocarbon feed essentially containing methane, and they preferably contain 6 to 25 wt. % nickel, for example on a support predominantly comprising alumina. Such a catalyst comprising nickel supported on alumina is typically used for hydrogen production and it is generally used with excess steam so as to limit the formation of coke on the catalyst. In such a context of industrial hydrogen production, the molar ratio between the steam and the carbon contained in the feed (steam/carbon ratio S/C calculated in moles) generally ranges between 2.5 and 3.5, preferably between 2.5 and 3, in order to guarantee the lifetime of the catalyst.

The nickel can come in form of nickel oxide. The mass fraction of nickel oxide of the catalyst in relation to the mass fraction of redox active mass preferably ranges between 0.1% and 15%, preferably between 0.5% and 15%, yet more preferably between 1% and 5%. These ranges allow to obtain good feed conversion while minimizing the amount of nickel to minimize the costs.

The catalyst is in form of untransported fluidized particles in reduction zone 120, i.e. the suspended state of the catalyst particles is such that the catalyst does not leave the fluidized bed of the reduction zone with fumes 16, unlike the oxygen carrier particles that are in a circulating fluidized bed and leave the reduction zone with fumes 16.

Two distinct particle populations, i.e. that of the oxygen carrier and that of the catalyst, with different suspended states, coexist within reduction zone 120. These different suspended states are essentially linked with the size and/or the density of each particle population.

According to the invention, the size of the catalyst particles is so selected that the particles have a minimum fluidization velocity $U_{mf}$ lower than a given gas velocity $V_{sg}$ in reduction zone 120 and a terminal free fall velocity $U_T$ greater than gas velocity $V_{sg}$. This selection, made prior to carrying out combustion, takes account of the gas velocity values considered in the combustion reactor and of the reactor design.

The size of the catalyst particles ranges for example between 1 mm and 30 mm, more preferably between 1.5 mm and 5 mm (Sauter mean diameter).

The particle grain size can be determined by means of many techniques known to the person skilled in the art, such as macroscopic methods like wet or dry laser diffraction analysis, or microscopic methods such as optical microscopy.

For indication only, gas velocity $V_{sg}$ in the reduction zone ranges between 3 m/s and 15 m/s, preferably between 5 m/s and 10 m/s.

Confinement of the catalyst within the reduction zone notably allows to limit the emission of catalyst fines through attrition linked with circulation in the loop. These fines are indeed unwanted, in particular when CMR materials such as nickel are used, and they represent a not insignificant catalyst loss that may greatly increase the operating cost linked with the supply of make-up catalyst.

Furthermore, confinement of the catalyst allows to prevent this catalyst from being sent to the oxidation zone and thus to maintain it in a reduced state likely to catalyze the reforming reactions. Compared with a configuration where the catalyst circulates in the loop, the invention thus allows to decrease the necessary amount of catalyst, and therefore the associated costs.

The reforming reactions according to Equations (6), (7) and (10) are generally highly endothermic and they require energy supply. In conventional industrial processes dedicated to reforming, two energy supply modes are generally applied: either introduction of free oxygen into the reaction medium to provide partial oxidation of the feed whose exotherm compensates for the endothermicity of the reforming reaction, or external heating.

According to the present invention, the heat produced by the CLC loop is used to provide the energy required for the reforming reactions. The balance of the heat of the reactions conducted in zones 110 and 120 is equal to the heating value of feed 17, in the same way as if the combustion thereof had been performed in a conventional combustion process. According to the invention, part of this heat capacity is advantageously used for conducting the catalytic reforming reactions of the gaseous hydrocarbon feed in reduction zone 120. In particular, the heat required for the reactions in reduction zone 120 is provided by the oxygen carrier.

The temperature of the fluidized bed in reduction zone 120 typically ranges between 700° C. and 1100° C., for example of the order of 950° C., which is compatible with the conventional operating temperatures of catalytic reforming reactions, ranging between 650° C. and 1000° C. approximately.

The contact time in the reduction zone typically ranges between 1 second and 1 minute, preferably between 1 and 20 seconds. The ratio of the amount of circulating active mass to the amount of oxygen to be transferred between the two reaction zones advantageously ranges between 30 and 100, preferably between 40 and 70.

The CLC process typically operates at low pressure, ranging from atmospheric pressure to less than 3 bars for example. This low pressure favours reforming reactions and it allows for example to minimize the gas compression energy cost, for example for the air used in the oxidation reactor, and thus to maximize the energy efficiency of the plant.

According to the invention, the catalyst is in form of untransported fluidized particles. It can be noted that a reforming catalyst in form of particles contained in internals, fastened for example to the combustion reactor walls, such as baskets, could be similarly confined within the combustion reactor and provide reforming of the gaseous hydrocarbon feed.

Figure 2:
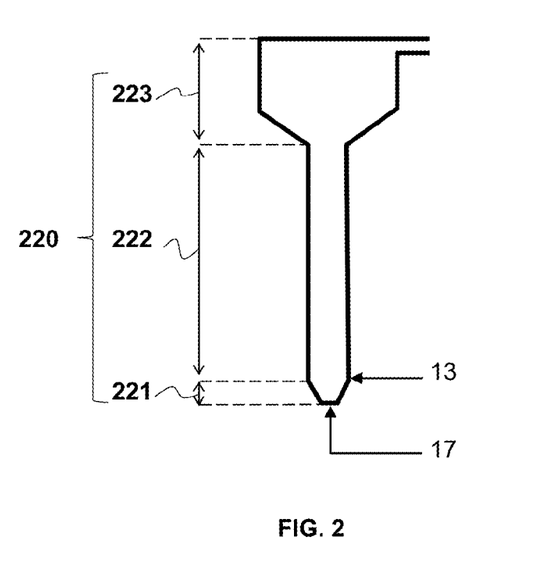
FIG. 2 is a simplified schematic cross-sectional view of an example of a combustion reactor used in the CLC process according to the invention.

FIG. 2 is a simplified cross-sectional diagram of an example of a combustion reactor used in the CLC process, by way of non limitative example.

The reduction zone consists of reactor 220 that comprises the three parts as follows:
  a part 221 at the base of the reactor allowing re-acceleration of the catalyst particles. This part 221 has the shape of an inverted truncated cone. It forms the bottom of the reactor that receives feed 17 and optionally the additional fluidization gas. Oxygen carrier particle stream 13 is generally sent into the reactor just above this part 221. This part 221 of the reactor allows to send the catalyst particles into the combustion zone topping it, to improve particle mixing and to reduce the risk of particle defluidization and agglomeration,
  a substantially cylindrical intermediate part 222 topping basal part 221, which corresponds to the main combustion and reforming zone, and
  a cylindroconical top part 223 for disengagement of the catalyst particles, topping intermediate part 222. This part allows to reduce the possible risk that the catalyst particles leave reactor 220.

Example

According to this example, in-situ reforming is performed using a catalyst in form of fluidized particles in the reduction reactor. The size of these catalyst particles is selected so as to have a minimum fluidization velocity lower than the gas velocity in the reactor and a terminal free fall velocity greater than the gas velocity in the reactor. This enables the particles to be fluidized while preventing them from being entrained out of the reactor. Selection of the catalyst particles size depends on the gas velocity in the fuel reactor and on the reactor design.

Various types of particles can be used as the reforming catalyst. This example utilizes nickel, which is the active metal predominantly used in industrial reforming catalysts for SMR and hydrogen production. The catalyst comprises nickel impregnated on an alumina support. Other catalysts such as metallic nickel particles could also be suited for in-situ reforming according to the invention.

Figure 3:
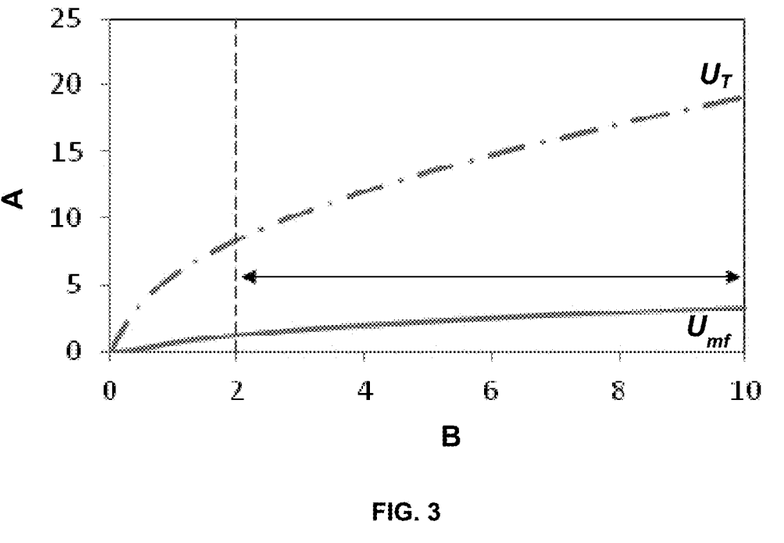
FIGS. 3 and 4 are diagrams showing the variation of the terminal free fall velocity and the minimum fluidization velocity for the particles of two nickel-based reforming catalysts, as a function of the particle diameter.

FIG. 3 is a diagram showing the variation of the minimum fluidization velocity $U_{mf}$ (solid curve) and of the terminal free fall velocity $U_T$ (dotted curve) of the nickel particles used as the reforming catalyst (velocity A on the ordinate in m/s), as a function of the diameter (B) of the catalyst particles (in mm). The particle size is represented by the Sauter mean diameter. The calculations are performed for a catalyst in form of $NiO/NiAl_2O_4$ (60/40) particles, produced by Marion Technologies, with a density of 4750 kg/m$^3$.

The diagram shows that 2-mm to 10-mm particles can be used in a fuel reactor operated in transported mode (riser) with, for example, a gas velocity $V_{sg}$ from 5 m/s to 8 m/s.

Tests were carried out using catalysts with different nickel mass fractions in relation to the oxygen carrier. The tests were conducted in a bubbling fluidized bed at 890° C. with pyrolusite as the oxygen carrier. The nickel was in form of 150 μm-diameter particles (Sauter mean diameter) in a NiO/NiAl$_2$O$_4$ (60/40 mass %) mixture. The oxygen carrier had the following characteristics: density: 3250 kg/m$^3$, oxygen transfer capacity: 6.7% and particle diameter: 208 μm.

The experimental results show that, for 0%, 1% and 5% NiO fractions in a pyrolusite bed, the carbon conversion rises from 25% to 76%, and to 88% in a batch reactor at 890° C. for CH$_4$ combustion.

Figure 4:
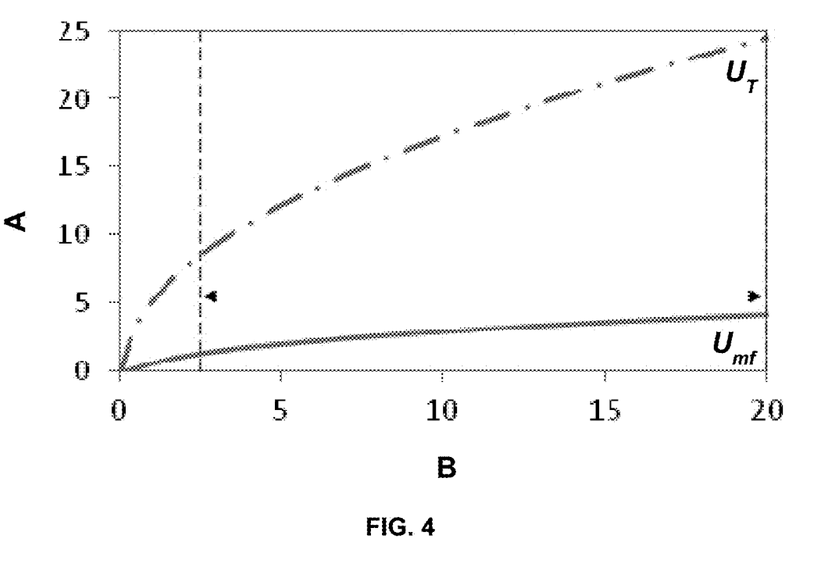

The diagram of FIG. 4 is of the same type as that of FIG. 3 and it shows the variations of the minimum fluidization velocity $U_{mf}$ (solid curve) and of the terminal free fall velocity $U_T$ (dotted curve) (velocity A on the ordinate in m/s), as a function of diameter (B), in mm, for particles of a commercial methane reforming catalyst containing 16.5 wt. % nickel oxide (BASF SG-9301). The measured density of the particles is 2680 kg/m$^3$.

The diagram shows that, in this case, 2.5-mm to 20-mm particles can be used in the fuel reactor.

The invention claimed is:

1. A method for chemical looping oxidation-reduction combustion of a gaseous hydrocarbon feed, comprising:
   performing combustion of a gaseous hydrocarbon feed within a fluidized-bed reduction zone through contact with a redox active mass in form of particles,
   performing catalytic reforming of said feed within said reduction zone on contact with a reforming catalyst distinct from the redox active mass, said catalyst being in a form of untransported fluidized particles confined within and not transported out of said reduction zone to produce syngas,
   performing combustion of the syngas produced by catalytic reforming within said reduction zone through contact with said redox active mass, and
   sending to a fluidized-bed oxidation zone the redox active mass particles that have stayed in the reduction zone in order to oxidize said redox active mass particles through contact with an oxidizing gas stream.

2. The method as claimed in claim 1, wherein the size of said catalyst particles is so selected that said particles have a minimum fluidization velocity Umf lower than a given gas velocity Vsg in the reduction zone and a terminal free fall velocity UT greater than said gas velocity Vsg.

3. The method as claimed in claim 1, wherein the size of the catalyst particles ranges between 1 mm and 30 mm.

4. The method as claimed in claim 1, wherein gas velocity Vsg in the reduction zone ranges between 3 m/s and 15 m/s.

5. The method as claimed in claim 1, wherein the reforming catalyst comprises nickel.

6. The method as claimed in claim 5, wherein the reforming catalyst comprises between 6 and 25 wt. % nickel.

7. The method as claimed in claim 5, wherein the nickel initially comes in form of nickel oxide, the mass fraction of nickel oxide of the catalyst in relation to the mass fraction of the redox active mass ranging between 0.1% and 15.

8. The method as claimed in claim 5, wherein the reforming catalyst comprises between 6 and 25 wt. % nickel on an alumina support.

9. The method as claimed in claim 5, wherein the nickel initially comes in form of nickel oxide, the mass fraction of nickel oxide of the catalyst in relation to the mass fraction of the redox active mass ranging between 1% and 5%.

10. The method as claimed in claim 1, wherein the redox active mass consists of metal oxides from ores.

11. The method as claimed in claim 1, wherein the grain size of the redox active mass particles is such that over 90% of the particles have a size ranging between 50 μm and 500 μm.

12. The method as claimed in claim 1, wherein the gaseous hydrocarbon feed essentially comprises methane.

13. The method as claimed in claim 12, wherein the gaseous hydrocarbon feed is natural gas, biogas or refinery gas.

14. A plant for combustion of a gaseous hydrocarbon feed as claimed in claim 1, comprising:
   a reduction zone including:
   means of injecting said gaseous hydrocarbon feed,
   an inlet for a stream of a redox active mass in form of particles,
   an outlet for a mixture comprising a gas stream and the active mass particles,
   a reforming catalyst in form of untransported fluidized particles confined within and not transported out of said reduction zone, and
   an oxidation zone provided with a feed point for redox active mass particles that have stayed in the reduction zone, means of injecting an oxidizing fluidization gas, and an outlet for an oxygen-depleted oxidizing gas and oxidized redox active mass particles.

15. The plant as claimed in claim 14, wherein the reduction zone is a reactor comprising:
   a basal part for catalyst particles re-acceleration, in form of an inverted truncated cone,
   a substantially cylindrical intermediate part topping said basal part,
   a cylindroconical top part for disengagement of the catalyst particles, topping said intermediate part.

16. The method as claimed in claim 1, wherein the size of the catalyst particles ranges between 1.5 mm and 5 mm.

17. The method as claimed in claim 1, wherein gas velocity Vsg in the reduction zone ranges between 5 m/s and 10 m/s.

18. The method as claimed in claim 1, wherein the grain size of the redox active mass particles is such that over 90% of the particles have a size ranging between 100 μm and 300 μm.

* * * * *